Patented Apr. 27, 1954

2,676,985

UNITED STATES PATENT OFFICE 2,676,985

PERFLUOROALKYL AMIDINES AND SALTS THEREOF

Donald R. Husted, St. Paul, Minn., assignor to Minnesota Mining & Manufacturing Company, St. Paul, Minn., a corporation of Delaware No Drawing. Application May 2, 1952,
Serial No. 285,805

2 Claims. (Cl. 260—564)

This invention relates to my discovery of a new and useful class of reactive fluorocarbon compounds.

These new compounds are the saturated aliphatic fluorocarbon amidines, which may be termed the perfluoroalkyl amidines, and the strong-acid salts thereof. These amidine compounds have the generic formula:

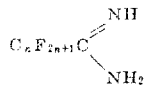

which also can be written as:

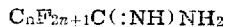

The compounds having from one to twelve carbon atoms in the molecule are of particular interest, for which $n$ has an integer value of 1 to 11 in the above formulas.

The first member of this amidine series is trifluoroacetamidine, $CF_3C(:NH)NH_2$, a viscous oily liquid at room temperature, having a boiling point of about 40–44° C. at 14 mm. pressure. The higher compounds are solids.

These amidine compounds have a strong amine-like odor and are weakly basic. So far as I am aware, these are the first perfluoro compounds to be reported which are basic in character and yet contain no carbon-bonded hydrogen and no carbonyl group. They readily form salts with strong acids, such as hydrochloric acid, sulfuric acid, trichloroacetic acid, trifluoroacetic acid, pentafluoropropionic acid, heptafluorobutyric acid, and higher perfluoroalkyl carboxylic acids having up to twelve carbon atoms in the molecule.

One of the striking chemical differences between these perfluoroalkyl amidines and the alkyl amidines of the hydrocarbon system of conventional organic chemistry, is that the former, unlike the latter, do not readily hydrolyze to the corresponding acids. Thus acetamidine, $CH_3C(:NH)NH_2$, readily hydrolyzes to acetic acid, $CH_3COOH$. The perfluoroalkyl amidines hydrolyze to the corresponding amides. Thus trifluoroacetamidine, $CF_3C(:NH)NH_2$, hydrolyzes to trifluoroacetamide, $CF_3CONH_2$. This behavior more nearly resembles that of the unsubstituted aromatic amidines of conventional organic chemistry.

Another striking chemical difference is shown in respect to the method of preparation. The present perfluoro compounds can be easily prepared in high yields by merely reacting the corresponding perfluoronitrile compounds with anhydrous liquid ammonia. The reaction proceeds to substantial completion upon mere standing of the mixture at room temperature in a closed vessel:

The crude amidine can be easily purified by vacuum distillation or sublimation, or by recrystallization from a solvent, such as ether or carbon tetrachloride.

The presence of ammonium chloride in the reaction mixture, if included, does not speed up the reaction and it makes the isolation of the desired product much more difficult. This is in contrast to the preparation of the hydrocarbon amidine compounds wherein ammonium chloride is employed as a catalyst and its presence is desirable.

The perfluoro amidines are very hygroscopic and must be stored in sealed moisture-free containers. They avidly absorb moisture and are hydrolyzed to the corresponding amides.

These new amidine compounds and their salts formed with strong acids, constitute a valuable new class of fluorocarbon compounds useful as chemical intermediates. The amidine compounds and their salts also have value as surface active agents, especially when they contain a fluorocarbon chain $(C_nF_{2n+1}-)$ having three or more carbon atoms therein. The fluorocarbon chain can be either a straight chain or a branched chain. These surface active agents are resistant to oxidation and have value for use in reducing the surface tension of non-aqueous liquids or solutions that are strongly oxidizing.

Fluorocarbon chains have unique properties in respect to solubility and surface active properties. They are both oleophobic and hydrophobic. They are highly stable and inert. Their presence in compounds which possess a hydrophilic active group (such as the present amidine group) results in unique properties, owing to the disparate properties of the fluorocarbon group and the reactive group of the molecule, and to the disparity between fluorocarbon groups and hydrocarbon groups.

*Example 1*

A dry ampoule was charged with 3.2 grams (0.0164 mole) of normal heptafluorobutyronitrile, $CF_3(CF_2)_2CN$, and 5.1 grams (0.3 mole) of anhydrous liquid ammonia $(NH_3)$, the latter being in large excess over the stoichiometric equimolar proportion, the excess serving as a solvent vehicle. The addition of both reactants was made by using a vacuum system and liquid-air refrigeration, these being condensed in the chilled ampoule, which was then sealed off. The ampoule was then warmed to room temperature and allowed to stand for two weeks. It was then opened and the excess ammonia was allowed to evaporate through a tube containing a drying agent (anhydrous calcium sulfate) to prevent entry of moisture. The product was purified by vacuum sublimation and resulted in a high yield of substantially pure heptafluorobutyramidine, $$CF_3(CF_2)_2C(:NH)NH_2$$

The acid salts were made by dissolving the amidine in ether and adding an excess of the acid in an anhydrous state. The salt is insoluble in the solution and can be recovered by filtration. In making the hydrochloride salt, dry hydrogen chloride gas was introduced into the amidine solution.

The melting point of heptafluorobutyramidine was found to be 52° C., while that of the hydrochloride salt was 128 to 129.5° C. The three most prominent lines in the DeBye-Scherrer X-ray fine powder pattern for the amidine are: I, 5.03, V. S.; II, 5.55, S; III, 6.67, M; and for the amidine hydrochloride salt are: I, 5.15, V. S.; II, 3.90, V. S.; III, 4.315, S. The infrared absorption curve for the amidine compound contains the two absorption bands characteristic of —NH and —NH₂ groups at 3400 cm.⁻¹ and 1600 cm.⁻¹, and a deep band at about 1650⁻¹ usually characteristic of a carbonyl group. These bands are very similar to those of the corresponding heptafluorobutyramide compound.

Example 2

Equal volumes of pentafluoropropionitrile, CF₃CF₂CN (B. P. —41° C. at 743 mm.), and anhydrous ammonia, were measured out and condensed in an evacuated glass ampoule immersed in liquid air. The frozen ampoule was subjected to vacuum and sealed off to exclude moisture. The total charge was 4.0 grams, made up of 3.6 grams (0.25 mole) of CF₃CF₂CN and 0.4 gram (0.24 mole) of ammonia. The ampoule was allowed to warm to room temperature. It was inspected after 24 hours and it was found that the contents had solidified. On opening, 4.0 grams of solid was obtained. This was purified by high-vacuum sublimination (at 40° C. and 10⁻⁴ mm. pressure). The product was identified as relatively pure pentafluoropropionamidine, CF₃CF₂C(:NH)NH₂. It had a melting point of 49.5–50° C.

A small portion was dissolved in anhydrous ether and the solution was saturated with hydrogen chloride, yielding the hydrochloride salt CF₃CF₂C(:NH)NH₂·HCl, which was recovered by filtration and then purified by high-vacuum sublimation. The three most prominent Debye-Scherrer lines are: I, 2.72, V. S.; II, 4.25, M. S.; III, 1.93, W.

Example 3

A dry ampoule was charged with 14.94 grams (0.038 mole) of liquid perfluorocaprylonitrile, CF₃(CF₂)₆CN. It was connected to a vacuum system, chilled in liquid-air, and then charged with 7.06 grams (0.038 mole) of anhydrous ammonia, and sealed off under vacuum. On warming the ampoule to room temperature, the reaction became rapid and appeared to be completed in a few minutes, a solid forming in the ampoule. It was allowed to stand overnight to insure completion. The crude amidine was obtained in approximately 100% yield (15.8 grams) and was purified by high-vacuum sublimation. The purified perfluorocaprylamidine, $$CF_3(CF_2)_6C(:NH)NH_2$$

had a melting point of 86–88° C.

Perfluorocaproamidine, CF₃(CF₂)₈C(:NH)NH₂ was similarly prepared and was found to have a melting point of 116–130° C.

Example 4

In a similar manner, an ampoule was charged with 4.3 grams (0.0215 mole) of perfluorocapronitrile, CF₃(CF₂)₄CN, and 4.2 grams (0.247 mole) of anhydrous ammonia. On warming to room temperature a solid product was rapidly formed. The crude product was purified by sublimation, yielding 4.1 grams of material identified as relatively pure perfluorocaproamidine, $$CF_3(CF_2)_4C(:NH)NH_2$$

having a melting point of 66° C. A portion was resublimed without change of melting point, showing that the first product was substantially pure.

A sample of the amidine product was dissolved in anhydrous ether and the solution was saturated with hydrogen chloride. The hydrochloride salt, perfluorocaproamidine hydrochloride, CF₃(CF₂)₄C(:NH)NH₂·HCl, was recovered as a white crystalline solid which sublimed rapidly at about 210° C. The four most prominent Debye-Scherrer lines are: I, 5.43; V. S.; II, 5.47, S.; III, 6.37, M. S.; IV, 5.21, M. S. These lines permit of ready identification.

A further sample of the amidine product was dissolved in anhydrous ether and heptafluorobutyric acid, CF₃(CF₂)₂COOH, was added until no further precipitate was formed. The latter was a white solid material that was recovered and identified as the perfluorocaproamidine heptafluorobutyrate salt:

$$CF_3(CF_2)_4C(:NH)NH_2 \cdot HOOC(CF_2)_2CF_3$$

This salt was purified by high-vacuum sublimation, yielding a white crystalline salt that had a sublimation temperature of about 140° C. The three most prominent Debye-Scherrer lines were found to be: I, 4.90, V. S.; II, 5.15, S.; III, 7.43, S.

I claim:

1. The new and useful compounds of the class consisting of the perfluoroalkyl amidines having the formula:

$$C_nF_{2n+1}C(:NH)NH_2$$

where $n$ has an integer value of 1 to 11, and the strong-acid salts thereof.

2. The new and useful compounds of the class consisting of the perfluoroalkyl amidines having the formula:

$$C_nF_{2n+1}C(:NH)NH_2$$

where $n$ has an integer value of 3 to 11, and the strong-acid salts thereof.

References Cited in the file of this patent

UNITED STATES PATENTS

| Number | Name | Date |
|---|---|---|
| 2,567,011 | Diesslin et al. | Sept. 4, 1951 |
| 2,617,817 | Ahlbrecht et al. | Nov. 11, 1952 |

FOREIGN PATENTS

| Number | Country | Date |
|---|---|---|
| 671,785 | Germany | Feb. 14, 1939 |

OTHER REFERENCES

Buckle: "J. Chem. Soc." (London), 1949, pp. 912–916.